2,805,259

REACTION PRODUCT OF HALOMETHYL ETHERS WITH DIENES

Charles D. Hurd, Evanston, Ill., assignor to Columbia-Southern Chemical Corporation, Pittsburgh, Pa., a corporation No Drawing. Application July 10, 1953,
Serial No. 367,341

4 Claims. (Cl. 260—614)

This invention relates to the reaction product of a mixed halomethyl ether of an unsaturated alcohol, and more particularly to allyl chloromethyl ether, with 1,3-butadiene and the substituted 1,3-butadienes.

Mixed halomethyl ethers react with 1,3-butadiene in the presence of zinc chloride, presumably according to the equation:

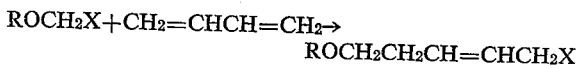

where R is a monovalent radical having at least 3 and not more than about 12 carbon atoms in which at least one pair of carbon atoms in an aliphatic chain is joined by a multiple bond, and X is a halogen, preferably chlorine. The alkenyl chloromethyl ethers and particularly allyl chloromethyl are preferred reagents. Assuming the above equation correctly represents the reaction that takes place, the reaction involves 1,4 addition, and when allyl chloromethyl ether is a reagent, the product is 5-allyloxy-1-chloro-2-pentene.

The products of this invention readily polymerize. They may also be copolymerized with other substances such as vinyl acetate, diallyl maleate, and styrene. A large variety of polymers, including elastomers, rigid thermosetting resins, and thermoplastics, may thus be formed.

The monomers prepared according to this invention contain a reactive halogen atom which reacts readily with silver nitrate. Ether-alcohols which are useful as solvents may be prepared by hydrolysis of the halogen atom with dilute alkali or sodium carbonate.

Substituted 1,3-butadienes, as for example chloroprene and isoprene, also react with mixed halomethyl ethers containing an unsaturated radical to form compounds whose polymers are useful as elastomers.

In carrying out the process of the present invention, the ether in liquid form may be added to 1,3-butadiene dissolved in carbon disulfide or other solvent. A small amount of anhydrous zinc chloride dissolved in the solvent catalyzes the reaction. Since butadiene is highly volatile, boiling at —3° C. at atmospheric pressure, the process is preferably conducted under pressure, or is conducted at low temperatures, about 5° to 15° C., at atmospheric pressure. The reaction takes considerable time, approximately 12 to 16 hours, depending on the ether being reacted, when conducted at low temperatures. After reaction is complete, the product is cooled and a small amount of a polymerization inhibitor, for example pyrogallol, is added. The reaction may be carried out between the ether and liquid butadiene in the absence of a solvent provided high pressures and/or low temperatures are used.

Alternatively gaseous butadiene may be bubbled through a liquid bath of the ether. In this mode of operation the amount of butadiene reacted per pass is low, and unreacted butadiene is continuously recycled.

Chloroprene, isoprene, and other substituted butadienes may be reacted in liquid form with ethers according to this invention. The substituted butadienes are much less volatile than butadiene, and no solvent is necessary. The pressure may be either atmospheric or elevated, and the temperature should be below the boiling point of the substituted butadiene at reaction pressure.

The following illustrative example of the process of this invention is given:

*Example*

Allyl chloromethyl ether was prepared by the reaction of allyl alcohol, paraformaldehyde, and hydrogen chloride. A 3-necked liter flask was fitted with a stirrer, calcium chloride drying tube and gas inlet tube. Thirty-six grams of dry hydrogen chloride was passed into 116 grams of chilled allyl alcohol while stirring. Thereafter, 30 grams of paraformaledhyde was introduced while the reaction mixture was gently stirred. This addition was followed by the addition of another 36 grams of hydrogen chloride and finally 30 grams of paraformaldehyde. Some of the latter failed to dissolve and more hydrogen chloride was added to effect complete solution. Two liquid phases formed and were separated. The ether layer was dried several hours with calcium chloride. The crude yield was 82 grams or 77 percent.

The crude product was distilled under diminished pressure to remove some of the allyl alcohol. The main fraction boiled at 106–107° C. This fraction was analyzed and found to contain 31.8 percent of chlorine (calculated: 33.3 percent of Cl) which suggested that allyl alcohol was the contaminant. The contaminated ether was refluxed for one hour with benzoyl chloride and dimethylaniline, and then distilled. Analysis of the product showed the following:

Boiling point _____ °C__ 107–108
Index of refraction $n_D^{23}$ _____ 1.431
Density $d_{20}^{23}$ _____ 1.025
Percent Cl _____ 32.5

This product which was allyl chloromethyl ether with small amounts of impurities was reacted with 1,3-butadiene to form an addition product.

To a mixture of 80 grams of carbon disulfide, 27 grams of 1,3-butadiene, and 1.5 grams of anhydrous zinc chloride was slowly added 42.5 grams of allyl chloromethyl ether. The mixture was thoroughly chilled and stirred during the addition and then allowed to rest at 5–15° C. for 15 hours. At the end of this time the product was poured into ice. The organic layer was removed and a trace of pyrogallol was added. Distillation yielded 21 grams or 33 percent of a constant boiling fraction whose boiling point was 90–92° C. at 21 millimeters' pressure.

Physical constants of the product are as follows:

Boiling point_____ 90–92° C. at 25 mm.
Density $d_{20}^{24}$_____ 0.9829.
Index of refraction $n_D^{24}$_____ 1.4590.
Percent Cl:
    Observed _____ 21.8.
    Calculated _____ 22.1.
Molecular refractivity:
    Observed _____ 44.65.
    Calculated for $C_8H_{13}ClO$ __ 44.72.

While the present present invention has been described with particular reference to allyl chlormethyl ether as the ethereal reagent, other mixed halomethyl ethers of unsaturated alcohols may be reacted. Particularly suitable are the alkenyl halomethyl ethers such as crotyl bromomethyl ether and methallyl chloromethyl ether. Mixed halomethyl ethers of other unsaturated alcohols, as for example cinnamyl chloromethyl ether and 2- butynyl chloromethyl ether, also react with the 1,3-butadienes.

Other variations from the specific procedures described herein will be evident to those of ordinary skill in the art. The invention is limited only by the scope of the appended claims.

I claim:
1. A compound of the formula:

$$ROCH_2CH_2CH=CHCH_2X$$

where R is a monovalent hydrocarbon radical having at least 3 and not more than 12 carbon atoms in which at least one pair of carbon atoms are linked by a multiple bond in an aliphatic chain and X is a halogen.

2. A compound of the formula:

$$ROCH_2CH_2CH=CHCH_2Cl$$

where R is a monovalent hydrocarbon radical having at least 3 and not more than 12 carbon atoms in which at least one pair of carbon atoms are linked by a multiple bond in an aliphatic chain.

3. A compound of the formula:

$$ROCH_2CH_2CH=CHCH_2Cl$$

in which R is an alkenyl radical having at least 3 and not more than 12 carbon atoms.

4. 5-allyloxy-1-chloro-2-pentene.

References Cited in the file of this patent
UNITED STATES PATENTS

| | | |
|---|---|---|
| 2,075,312 | Straus | Mar. 30, 1937 |
| 2,624,753 | Emerson et al. | Jan. 6, 1953 |
| 2,653,173 | Niederhauser | Sept. 22, 1953 |

OTHER REFERENCES

Petrov: Chem. Abstracts, vol. 35 (1941) column 3592–3 (2 pages), January 28, 1950.